(12) United States Patent
Wang et al.

(10) Patent No.: US 11,238,177 B2
(45) Date of Patent: Feb. 1, 2022

(54) MULTIUSER INFORMATION EXCHANGE MANAGEMENT

(71) Applicant: LENOVO (Singapore) PTE. LTD., New Tech Park (SG)

(72) Inventors: Song Wang, Cary, NC (US); Jian Li, Durham, NC (US); Ming Qian, Cary, NC (US); Yang Wang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 209 days.

(21) Appl. No.: 16/575,130

(22) Filed: Sep. 18, 2019

(65) Prior Publication Data

US 2021/0081563 A1    Mar. 18, 2021

(51) Int. Cl.
| | | |
|---|---|---|
| *G06F 21/00* | (2013.01) | |
| *G06F 21/62* | (2013.01) | |
| *G06F 21/60* | (2013.01) | |
| *G06F 3/16* | (2006.01) | |

(52) U.S. Cl.
CPC .......... *G06F 21/6245* (2013.01); *G06F 3/167* (2013.01); *G06F 21/602* (2013.01); *G06F 21/6272* (2013.01)

(58) Field of Classification Search
None
See application file for complete search history.

(56) References Cited

U.S. PATENT DOCUMENTS

| | | | | |
|---|---|---|---|---|
| 10,992,679 B1 * | 4/2021 | Fakhraie | ............... | H04L 63/102 |
| 2004/0252185 A1 * | 12/2004 | Vernon | .................. | G06Q 10/10 |
| | | | | 348/14.08 |
| 2018/0331824 A1 * | 11/2018 | Racz | .................... | G08B 13/196 |

* cited by examiner

*Primary Examiner* — Andrew J Steinle
(74) *Attorney, Agent, or Firm* — Kunzler Bean & Adamson (57) ABSTRACT

For multiuser information exchange management, a processor receives information permissions for a plurality of participants in an electronic forum. The information permissions include an audio permission, a video permission, a file share permission, a drawing permission, and/or a presentation permission for each participant. The processor provides forum information to each participant based on the information permissions. The audio permission is required to receive audio from the electronic forum. The video permission is required to receive video from the electronic forum. The file share permission is required to receive a file from the electronic forum. The drawing permission is required to receive a drawing from the electronic forum. The presentation permission is required to receive a presentation from the electronic forum.

20 Claims, 6 Drawing Sheets

| Audio Permission 201 | Audio Timestamp 221 |
| --- | --- |
| Video Permission 203 | Video Timestamp 223 |
| File Share Permission 205 | File Share Timestamp 225 |
| Drawing Permission 207 | Drawing Timestamp 227 |
| Presentation Permission 209 | Presentation Timestamp 229 |

| Audio 251 |
| --- |
| Video 253 |
| File 255 |
| Drawing 257 |
| Presentation 259 |

| Command 270 |
| --- |

MULTIUSER INFORMATION EXCHANGE MANAGEMENT

FIELD

The subject matter disclosed herein relates to multiuser information exchange and more particularly relates to multiuser information exchange management.

BACKGROUND

Diverse participants share information in electronic forums.

BRIEF SUMMARY

An apparatus for multiuser information exchange management is disclosed. The apparatus includes a processor and a memory that stores code executable by the processor. The processor receives information permissions for a plurality of participants in an electronic forum. The information permissions include an audio permission, a video permission, a file share permission, a drawing permission, and/or a presentation permission for each participant. The processor provides forum information to each participant based on the information permissions. The audio permission is required to receive audio from the electronic forum. The video permission is required to receive video from the electronic forum. The file share permission is required to receive a file from the electronic forum. The drawing permission is required to receive a drawing from the electronic forum. The presentation permission is required to receive a presentation from the electronic forum. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
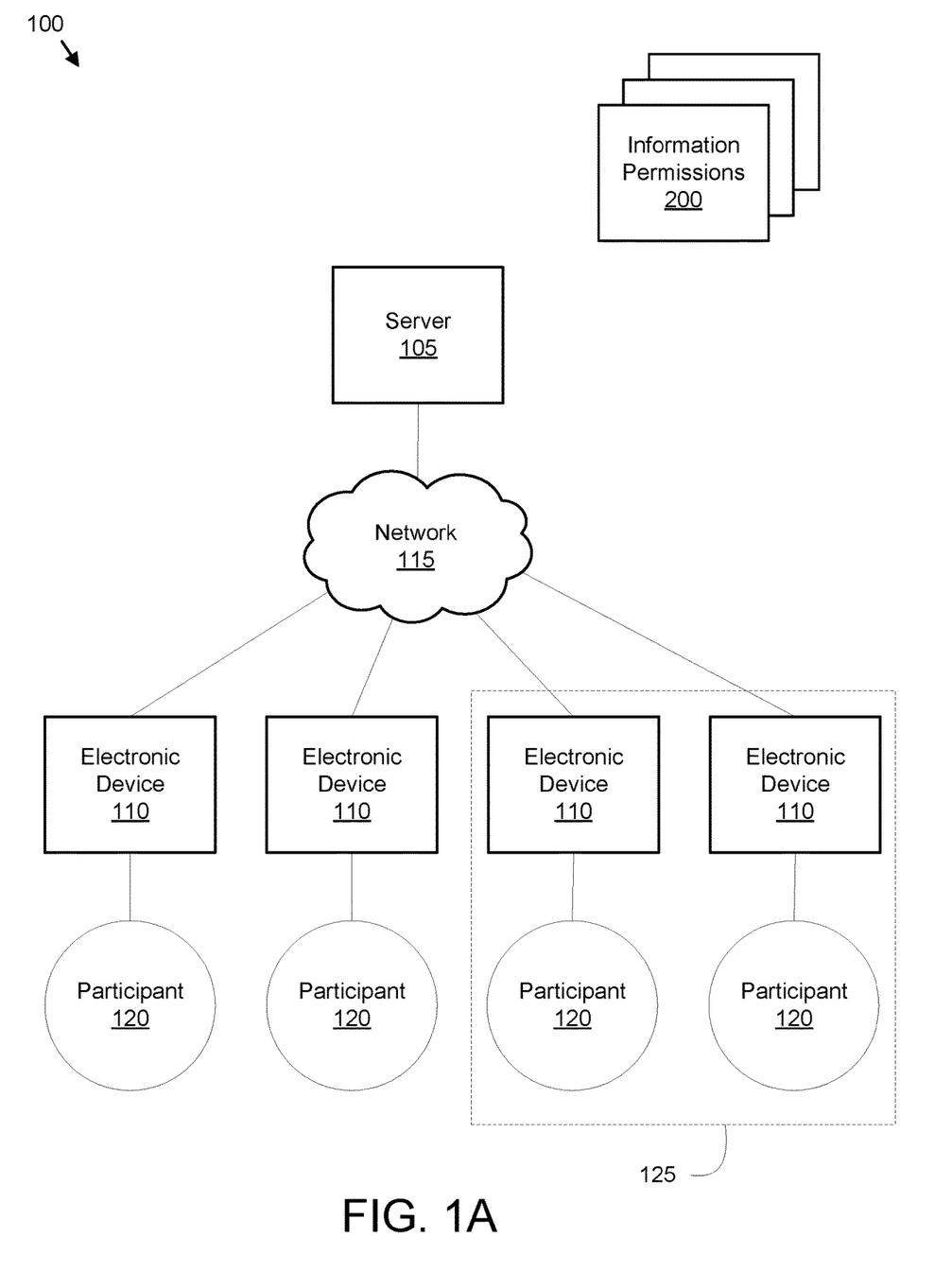
FIG. 1A is a schematic block diagram illustrating one embodiment of an electronic forum.

FIG. 1A is a schematic block diagram illustrating one embodiment of an electronic forum 100. The electronic forum 100 allows one or more participants 120 to collaborate and share information online. In the depicted embodiment, the electronic forum 100 includes a server 105, a network 115, a plurality of electronic devices 110, and a plurality of participants 120. In addition, the electronic forum 100 may include one or more sets of information permissions 200. The network 115 may be the Internet, a mobile telephone network, a WI-FI wireless network, a wide-area network, a local area network, or combinations thereof. The electronic forum 100 may be an audio conference, a video conference, a virtual conference, and the like.

The participants 120 collaborate and share forum information through the electronic devices 110. The forum information may include audio, video, files, drawings, and/or presentations. The electronic devices 110 may communicate through the network 115. In addition, the server 105 may manage the exchanges of forum information in the electronic forum 100.

Typically, each participant in the electronic forum 100 is able to access all forum information that is shared in the electronic forum 100. However, it may be advantageous to not share some forum information with some participants 120. For example, it may be critical to share confidential forum information with only a limited set of participants 120 that are authorized to receive the confidential form information. The embodiments receive the information permissions 200 for the participants 120 and provide the forum information to each participant 120 based on the information permissions 200. As result, each participant 120 only receives forum information that the participant 120 should have access to.

In one embodiment, one or more participants 120 may be categorized in a group 125. In a certain embodiment, the participants 120 in the group 125 share a set of information permissions 200.

Figure 1B:
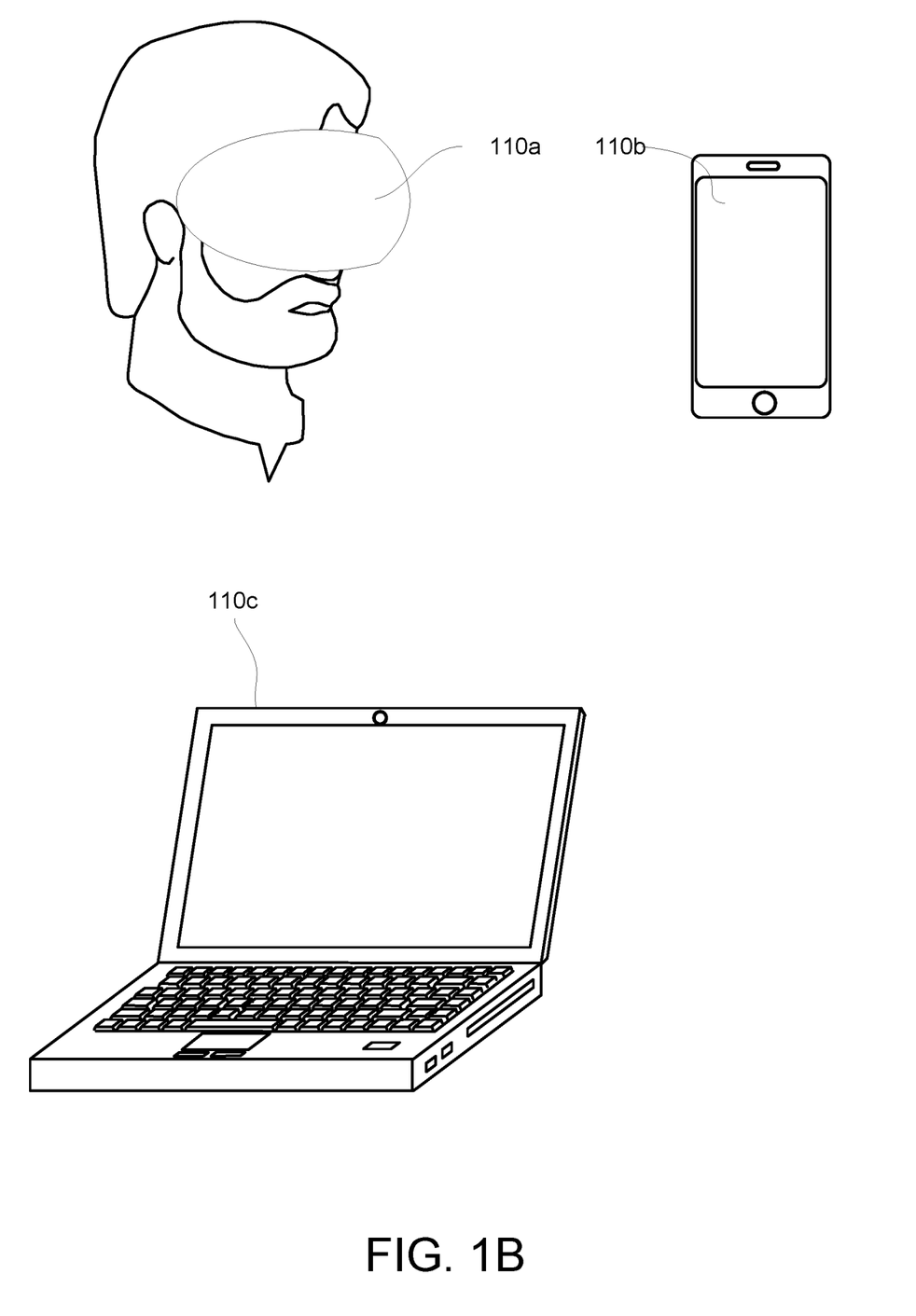
FIG. 1B is drawings of illustrating embodiments of electronic devices.

FIG. 1B is drawings of illustrating embodiments of electronic devices 110. In the depicted embodiment, a virtual-reality electronic device 110a, a mobile telephone electronic device 110b, and a laptop computer electronic device 110c are shown. Other electronic devices 100 may be employed. The electronic devices 110 may exchange forum information including audio, video, files, drawings, and/or presentations.

Figure 2A:
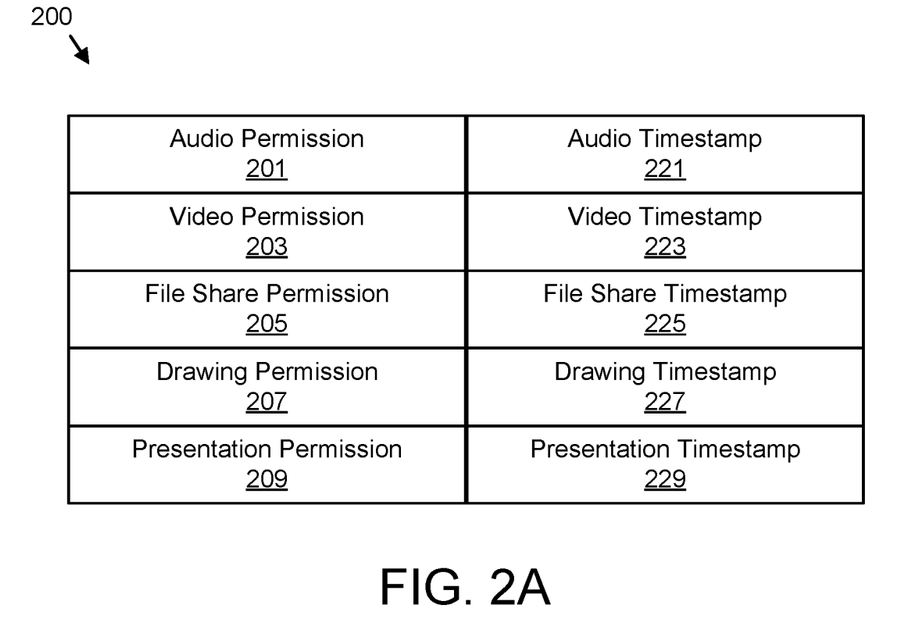
FIG. 2A is a schematic block diagram illustrating one embodiment of information permissions.

FIG. 2A is a schematic block diagram illustrating one embodiment of the information permissions 200. The information permissions 200 specify the forum information 250 that each participant 120 may receive from the electronic forum 100. The information permissions 200 maybe organized as a data structure in a memory. In the depicted embodiment, the information permissions 200 includes an audio permission 201, a video permission 203, a file share permission 205, a drawing permission 207, and a presentation permission 209. In addition, the information permissions 200 may include an audio time stamp 221, a video time stamp 223, a file share timestamp 225, a drawing timestamp 227, and a presentation timestamp 229. In one embodiment, each permission 201/203/205/207/209 may have a corresponding timestamp 221/223/225/227/229.

The audio permission 201 may be required to receive audio from the electronic forum 100. The video permission 203 may be required to receive video from the electronic forum 100. The file share permission 205 may be required to receive a file from the electronic forum 100. The drawing permission 207 may be required to receive a drawing from the electronic forum 100. The presentation permission 209 may be required to receive a presentation from the electronic forum 100.

The server 105 and/or electronic device 110 may communicate the audio, the video, the file, the drawing, and/or the presentation in response to a corresponding permission 201/203/205/207/209 being set. For example, server 105 and/or electronic device 110 may communicate the audio in response to the audio permission 201 being set.

In one embodiment, the server 105 and/or electronic device 110 communicates the audio, the video, the file, the drawing, and/or the presentation in response to the corresponding timestamp 221/223/225/227/229 preceding a current time. For example, the server 105 and/or electronic device 110 may communicate the video in response to the video timestamp 223 preceding the current time.

The server 105 and/or electronic device 110 may communicate the audio, the video, the file, the drawing, and/or the presentation in response to both a corresponding permission 201/203/205/207/209 being set and the corresponding timestamp 221/223/225/227/229 preceding the current time. For example, server 105 and/or electronic device 110 may communicate the presentation in response to both the presentation permission 209 being set and the presentation timestamp 229 preceding the current time.

Figure 2B:
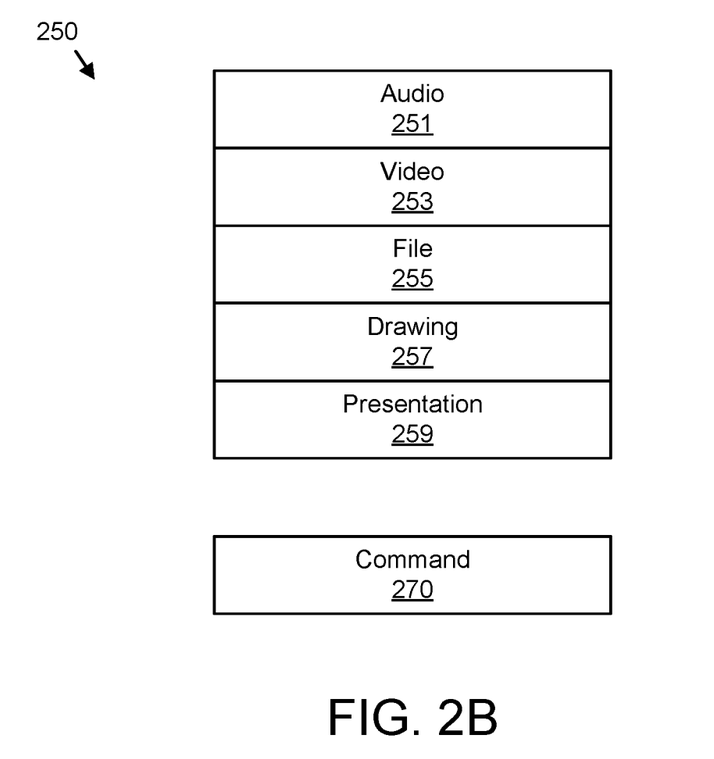
FIG. 2B is a schematic block diagram illustrating one embodiment of forum information.

FIG. 2B is a schematic block diagram illustrating one embodiment of forum information 250. The forum information 250 may be communicated between the electronic devices 110 and/or server 105 over the network 115. The forum information 250 maybe organized as data in one or more packets. In addition, the forum information 250 maybe organized as a data structure in a memory. In the depicted embodiment, the forum information 250 includes the audio 251, the video 253, a file 255, the drawing 257, and/or the presentation 259. In addition, the forum information 250 may include a command 270.

The audio 251 may include audio data from one or more participants 120. The video 253 may include video data from one or more participants 120. The file 255 may comprise data organized in a file structure that is shared between participants 120. The drawing 257 may include bitmapped, vector, and the like graphic information that is generated by a participant 120 and rendered for other participants 120. The presentation 259 may be a presentation data structure that is presented by a first participant 120 to other participants 120.

The command 270 may be received by an electronic device 110. The command 270 may be received as a voice command. In addition, the command 270 may be received through the user interface as will be described hereafter. The command 270 may specify and/or modify the information permissions 200. For example, the information permissions 200 may be received from a first participant 120 as a voice command 270. In addition, the information permissions 200 may be received through the user interface.

Figure 3:
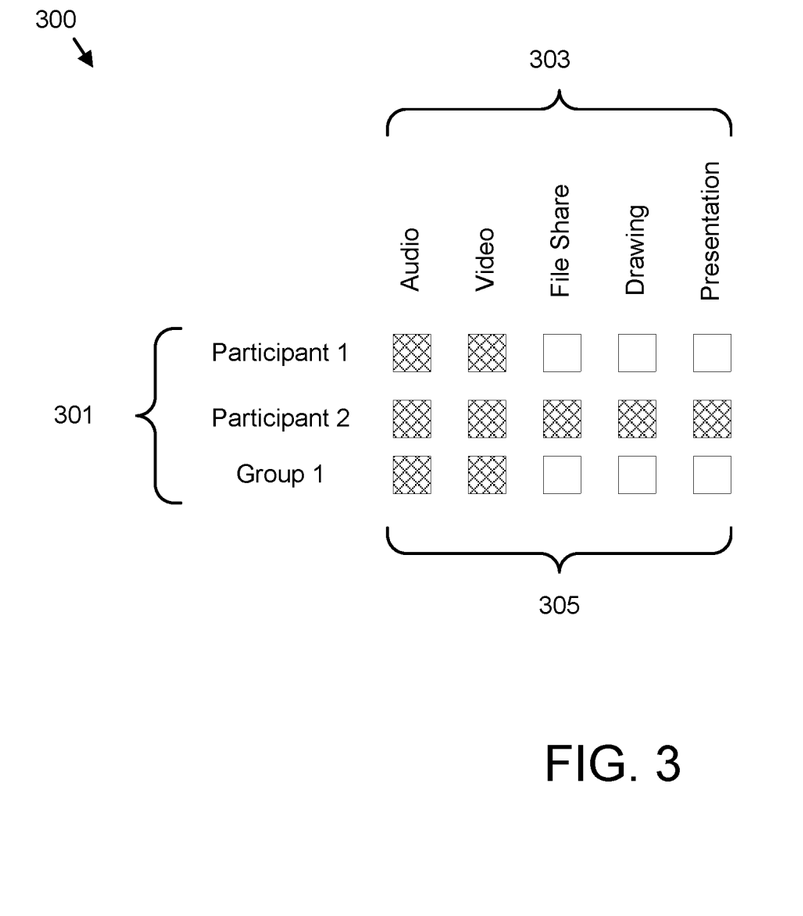
FIG. 3 is drawing illustrating one embodiment of a user interface.

FIG. 3 is drawing illustrating one embodiment of a user interface 300. The user interface 300 may be presented to a participant 120 on a display of the electronic device 110. In addition, the participant 120 may interact with the user interface 300 using a keyboard, a pointing device, and the like.

In one embodiment, the user interface 300 displays information types 303 comprising the forum information 250 employed in a given electronic forum 100. In addition, the user interface 300 may display the participants 120 and/or groups 125 participating in the electronic forum 100. In the depicted embodiment, participants 120 that are part of a group 125 are only presented as part of the group 125. In an alternative embodiment, participants 120 that are part of a group 125 are presented both individually and as part of the group. In a certain embodiment, both the group 125 and the participants of the group 125 are presented in the user interface 300.

The user interface 300 may receive permission selections 305 for each combination of information type 303 and participant 120 and/or group 125. The permissions selections 305 may specify which participant 120 and/or group 125 may receive which forum information 250. The permission selections 305 may set the corresponding permissions 201/203/205/207/209. In addition, the permission selections 305 may set the corresponding timestamps 221/223/225/

227/229 to a current time. In a certain embodiment, the permission selections 305 may set the corresponding timestamps 221/223/225/227/229 to a specified time.

In one embodiment, the user interface 300 receives a single set of information permissions 200 for each of the plurality of participants 120. The user interface 300 may receive the single set of information permissions 200 from an administrator. The administrator may be a designated participant 120.

In a certain embodiment, instances of the user interface 300 receive information permissions 200 for each of the plurality of participants 120 from each of the plurality of participants 120. For example, a first instance of the user interface 300 may receive first information permissions 200 from a first participant 120 and the second instance of the user interface 300 may receive second information permissions 200 from a second participant 120.

In one embodiment, the information permission 200 received from a participant 120 applies only to the forum information 250 originating from that participant 120. For example, the information permission 200 received from a first participant 120 may apply only to the audio 251, video 253, file 255, drawing 257, and/or presentation 259 originating from the first participant 120.

In an alternative embodiment, the information permission 200 received from a participant 120 applies to all the forum information 250 originating from all participants 120. In a certain embodiment, the information permission 200 received from the participant 120 applies only to the participants 120 as specified in the user interface 300 by the permissions selections 305.

Figure 4:
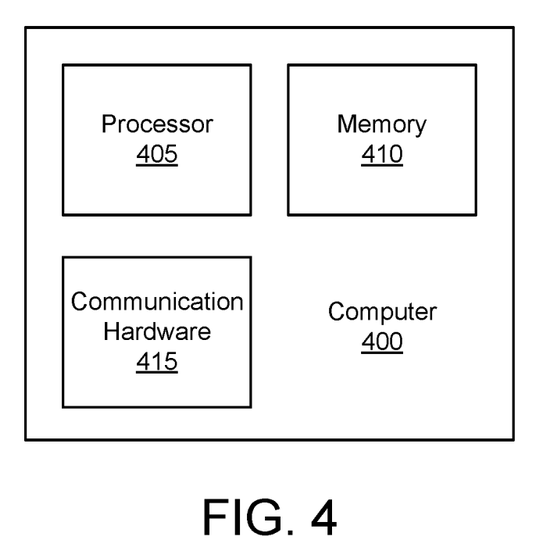
FIG. 4 is a schematic block diagram illustrating one embodiment of a computer.

FIG. 4 is a schematic block diagram illustrating one embodiment of a computer 400. The computer 400 may be embodied each of the electronic devices 110 and the server 105. In the depicted embodiment, the computer 400 includes a processor 405, a memory 410, and communication hardware 415. The memory 410 may include a semiconductor storage device, a hard disk drive, an optical storage device, or combinations thereof. The memory 410 may store code. The processor 405 may execute the code. The communication hardware 415 may communicate with other devices such as the network 115.

Figure 5:
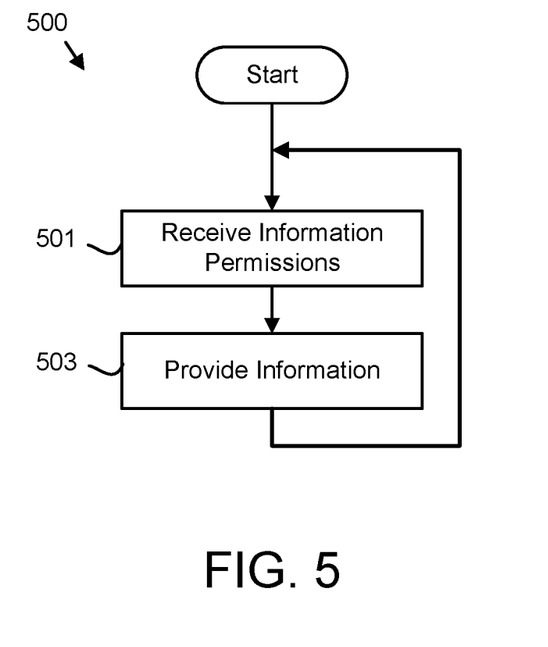
FIG. 5 is a schematic flow chart diagram illustrating one embodiment of a forum information management method.

FIG. 5 is a schematic flow chart diagram illustrating one embodiment of a forum information management method 500. The method 500 may receive information permissions 200 for the plurality of participants 120 in the electronic forum 100 and provide the forum information 250 to each participant 120 based on the information permissions 200. The method 500 may be performed by the processor 405.

The method 500 starts, and in one embodiment, the processor 405 receives 501 the information permissions 200 for the plurality of participants 120 in the electronic forum 100. The information permissions 200 may be received 501 from the user interface 300. In one embodiment, the user interface 300 generates the command 270 that is communicated to the server 105. In addition, the information permissions 200 may be received 501 as a voice command 270. In one embodiment, the information permissions 200 are received 501 from an administrator. In addition, sets of information permissions 200 may be received 501 from each participant 120.

The information permissions 200 may comprise the audio permission 201, the video permission 203, the file share permission 205, the drawing permission 207, and/or the presentation permission 209 for each participant 120. In one embodiment, one or more participants 120 are organized in a group 125. A first set of information permissions 200 may be assigned to the group 125. The information permissions 200 for each participant 120 in the group 125 may be the information permissions 200 for the group 125.

The information permissions 200 may be received 501 at any time during the electronic forum 100. For example, a first participant 120 may communicate updated information permissions 200 to the processor 405 before sharing confidential forum information 200 with only specified participants 120. Updating the information permissions 250 may comprise updating a corresponding timestamp 221/223/225/227/229 with the current time if permission is granted and updating the corresponding timestamp 221/223/225/227/229 with a null value if the permission is withdrawn. In addition, updating the information permissions 250 may comprise setting the corresponding permission 201/203/205/207/209 if permission is granted and clearing the permission 201/203/205/207/209 if the permission is withdrawn.

For example, the administrator may update the drawing permission 207 for a first participant 120 to withdraw the drawing permission 207. The server 105 may record a null value to the drawing timestamp 227 for the first participant 120. In addition, the server 105 may clear the drawing permission 207. As a result, the first participant 120 will subsequently not receive a drawing 257. Similarly, the administrator may update the drawing permission 207 for the first participant 120 to grant the drawing permission 207. The server 105 may record a current time to the drawing timestamp 227 for the first participant 120. As a result, the first participant 120 will subsequently receive the drawing 257.

The processor 405 may provide 503 the forum information 250 to each participant 120 based on the information permissions 200. The audio permission 201 may be required to receive audio 251 from the electronic forum 100. The video permission 203 may be required to receive video 253 from the electronic forum 100. The file share permission 205 may be required to receive a file 255 from the electronic forum 100. The drawing permission 207 may be required to receive a drawing 257 from the electronic forum 100. The presentation permission 209 may be required to receive a presentation 259 from the electronic forum 100.

In one embodiment, the server 205 communicates the audio 251, the video 253, the file 255, the drawing 257, and/or the presentation 259 in response to the corresponding timestamp 221/223/225/227/229 preceding the current time. In addition, the server 205 communicates the audio 251, the video 253, the file 255, the drawing 257, and/or the presentation 259 in response to the corresponding permission 201/203/205/207/209 being set. The processor 405 may further loop to receive 501 subsequent information permissions 200.

The embodiments receive the information permissions 200 and provide the forum information 250 based on the information permissions 200. As a result, an administrator and/or each participant 120 may grant or restrict specific forum information 250 for specific participants 120. Thus, forum information 250 may be selectively withheld from participants 120, facilitating the selective dissemination of information within the electronic forum 100. A single electronic forum 100 may thus be used to selectively share the forum information 250 among a larger group of participants 120 than could participate in the electronic forum 100 if all participants 120 received the same forum information 250. Thus the efficiency of the electronic forum 100 and the computers 400 employed therein is improved using the information permissions 200.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   receive information permissions for a plurality of participants in an electronic forum, the information permissions comprising each of an audio permission, a video permission, a file share permission, and a presentation permission for each participant and wherein the information permissions are one of unique for each participant and assigned to a group; and
   provide information to each participant based on the information permissions, wherein the audio permission is required to receive audio from the electronic forum, the video permission is required to receive video from the electronic forum, the file share permission is required to receive a file from the electronic forum, and the presentation permission is required to receive a presentation from the electronic forum.

2. The apparatus of claim 1, wherein the audio permission, the video permission, the file share permission, a drawing permission, and the presentation permission each comprise a timestamp, and wherein a server communicates the audio, the video, the file, the drawing, and/or the presentation in response to the timestamp preceding a current time.

3. The apparatus of claim 1, wherein a single set of information permissions for each of the plurality of participants is received from an administrator.

4. The apparatus of claim 1, wherein a plurality of sets of information permissions for each of the plurality of participants are received from each participant.

5. The apparatus of claim 1, wherein one or more participants are organized in the group, a first set of information permissions are assigned to the group, and the information permissions for each participant in the group are the information permissions for the group.

6. The apparatus of claim 1, wherein the information permissions are received as a voice command.

7. The apparatus of claim 1, wherein the information permissions are received through a user interface.

8. A method comprising:
   receiving, by use of a processor, information permissions for a plurality of participants in an electronic forum, the information permissions comprising each of an audio permission, a video permission, a file share permission, and a presentation permission for each participant and wherein the information permissions are one of unique for each participant and assigned to a group; and
   providing information to each participant based on the information permissions, wherein the audio permission is required to receive audio from the electronic forum, the video permission is required to receive video from the electronic forum, the file share permission is required to receive a file from the electronic forum, and the presentation permission is required to receive a presentation from the electronic forum.

9. The method of claim 8, wherein the audio permission, the video permission, the file share permission, a drawing permission, and the presentation permission each comprise a timestamp, and wherein a server communicates the audio, the video, the file, the drawing, and/or the presentation in response to the timestamp preceding a current time.

10. The method of claim 8, wherein a single set of information permissions for each of the plurality of participants is received from an administrator.

11. The method of claim 8, wherein a plurality of sets of information permissions for each of the plurality of participants is received from each participant.

12. The method of claim 8, wherein one or more participants are organized in the group, a first set of information permissions are assigned to the group, and the information permissions for each participant in the group are the information permissions for the group.

13. The method of claim 8, wherein the information permissions are received as a voice command.

14. The method of claim 8, wherein the information permissions are received through a user interface.

15. A program product comprising a non-transitory computer readable storage medium that stores code executable by a processor, the executable code comprising code to:
   receive information permissions for a plurality of participants in an electronic forum, the information permissions comprising each of an audio permission, a video permission, a file share permission, and/or a presentation permission for each participant and wherein the information permissions are one of unique for each participant and assigned to a group; and
   provide information to each participant based on the information permissions, wherein the audio permission is required to receive audio from the electronic forum, the video permission is required to receive video from the electronic forum, the file share permission is required to receive a file from the electronic forum, and the presentation permission is required to receive a presentation from the electronic forum.

16. The program product of claim 15, wherein the audio permission, the video permission, the file share permission, a drawing permission, and the presentation permission each comprise a timestamp, and wherein a server communicates the audio, the video, the file, the drawing, and/or the presentation in response to the timestamp preceding a current time.

17. The program product of claim 15, wherein a single set of information permissions for each of the plurality of participants is received from an administrator.

18. The program product of claim 15, wherein a plurality of sets of information permissions for each of the plurality of participants is received from each participant.

19. The program product of claim 15, wherein one or more participants are organized in the group, a first set of information permissions are assigned to the group, and the information permissions for each participant in the group are the information permissions for the group.

20. The program product of claim 15, wherein the information permissions are received as a voice command.

* * * * *